(12) United States Patent
Babin et al.

(10) Patent No.: US 6,257,271 B1
(45) Date of Patent: Jul. 10, 2001

(54) SERVO OPERATED VALVE WITH SONICALLY WELDED HOUSING AND METHOD OF MAKING SAME

(75) Inventors: Christopher J. Babin, Rochester Hills; Timothy J. Green, Holly, both of MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/434,050

(22) Filed: Nov. 4, 1999

(51) Int. Cl.[7] .................................................. F16K 27/00
(52) U.S. Cl. .............................. 137/315.17; 137/315.25; 251/129.11
(58) Field of Search .................... 137/315.17, 315.18, 137/15.17, 15.18, 15.22, 315.25; 251/129.11

(56) References Cited

U.S. PATENT DOCUMENTS 4,592,505 * 6/1986 Brunninga et al. ......... 137/624.18 X
5,083,745 * 1/1992 Tischer ........................... 251/129.11

* cited by examiner

*Primary Examiner*—Kevin Lee
(74) *Attorney, Agent, or Firm*—Roger A. Johnston

(57) ABSTRACT

An electric servo motor operated valve has a motor and gear reduction subassembly and a valve body subassembly with a cross-ported cylindrical rotary valve member with an arcuately shaped resilient face seal member for sealing about the cross port. The motor gear subassembly is attached to the valve body subassembly by sonic weldment.

6 Claims, 3 Drawing Sheets

SERVO OPERATED VALVE WITH SONICALLY WELDED HOUSING AND METHOD OF MAKING SAME

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to electrically operated valves of the type having a rotatable valve member received in the valving chamber in a valve body for, upon rotation, controlling flow between an inlet and outlet passage communicating with the valving chamber. Electric servo operated valves have found particular application in controlling flow of hot water to heat exchangers such as the heater core for heating the passenger compartment of a motor vehicle.

Currently it is necessary to offer an electrically controlled climate control system for the motor vehicle passenger compartment to be competitive in the automotive marketplace. This type of system has necessitated servo operation of the heater core water valve; and, in order to minimize the manufacturing costs of the motor and valve assembly, and to improve reliability and reduce the risk of leakage of the hot water circulated to the heater core, it has been desired to provide a permanently sealed assembly.

Heretofore, servo operated water valves for controlling flow of hot water to a motor vehicle passenger compartment heater core required a separate seal between the motor drive unit and the valve body and the use of separate fasteners to attach the motor drive unit to the valve body. This arrangement required separate assembly fixtures and additional operations in installing the fasteners, all of which resulted in relatively high manufacturing costs. Such fasteners, typically formed of metallic material, have been a source of metal corrosion and swelling which has resulted in rupture of the valve body and motor housing which are typically formed of plastic material. It has thus long been desired to find a way or means of assembling a servo operated rotary water valve for controlling flow in response to an electrical control signal and which does not require fasteners during assembly and is robust and relatively low in manufacturing costs enabling the valve to be competitive in high volume mass production.

BRIEF SUMMARY OF THE INVENTION

The present invention provides a servo motor operated rotary valve having the valve body and servo motor housing formed of plastic material, the valve being suitable for electrically actuated control of fluid flow in a system; and, the valve is particularly suitable for the control of hot water flow to a motor vehicle passenger compartment heater core. The valve employs a barrel type rotary valve member and has a servo motor drive unit pre-assembled in a housing to form a subassembly which is then attached and permanently sealed to the valve body by sonic welding. In the preferred form, the servo motor housing includes a motor and speed reducer and the motor housing is formed as a subassembly with a shell and cover attached by sonic welding. The construction of the servo operated valve assembly of the present invention provides a sealed unit which is quite easy to fabricate in high volume mass production, such as for automotive applications. The valve body and motor housing are formed of plastic materials as is common in automotive heater core water valve applications and thus provides a robust assembly for such applications.

DETAILED DESCRIPTION OF THE INVENTION

Figure 1:
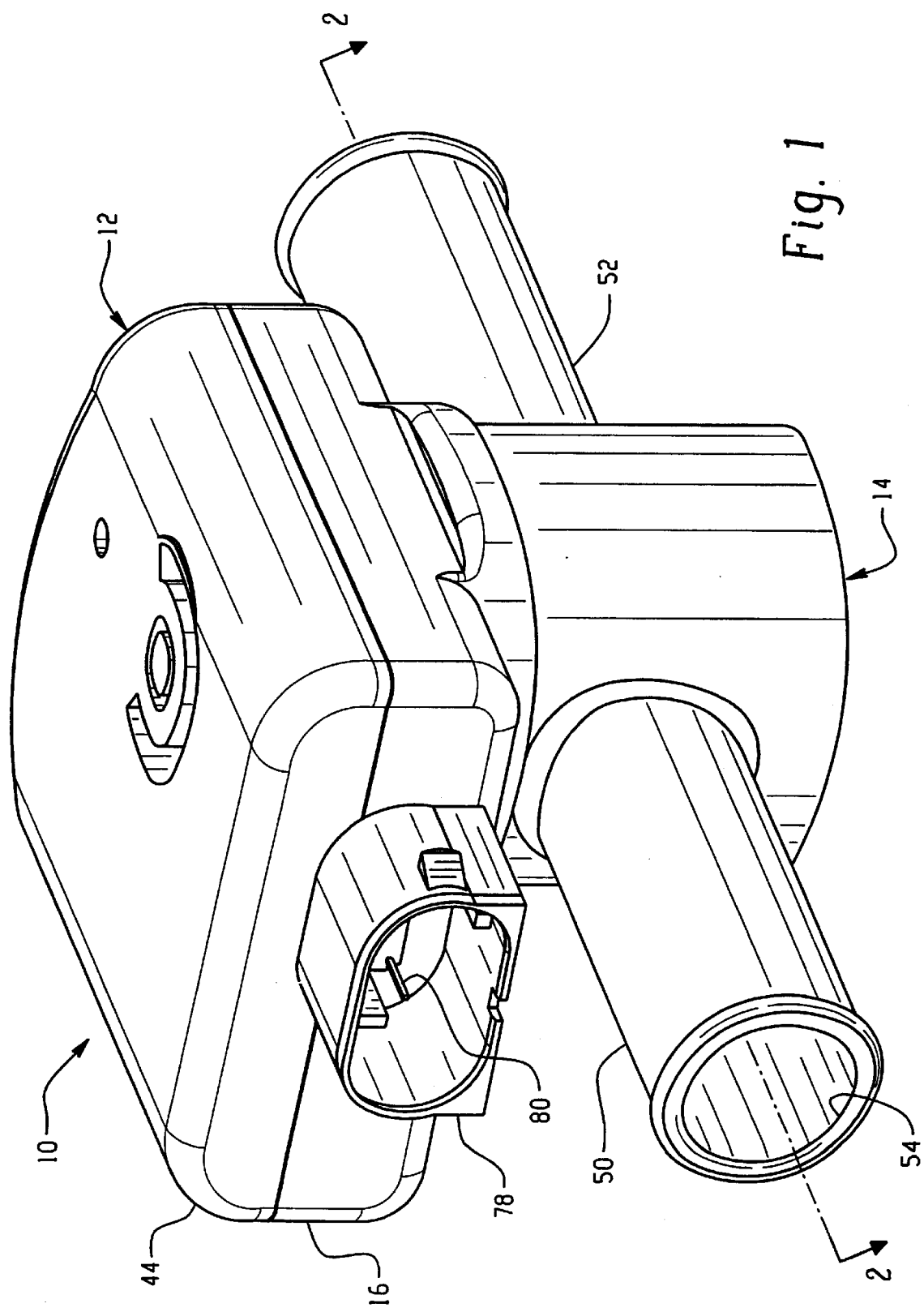
FIG. 1 is an axonometric view of the servo operated valve assembly of the present invention.
Figure 2:
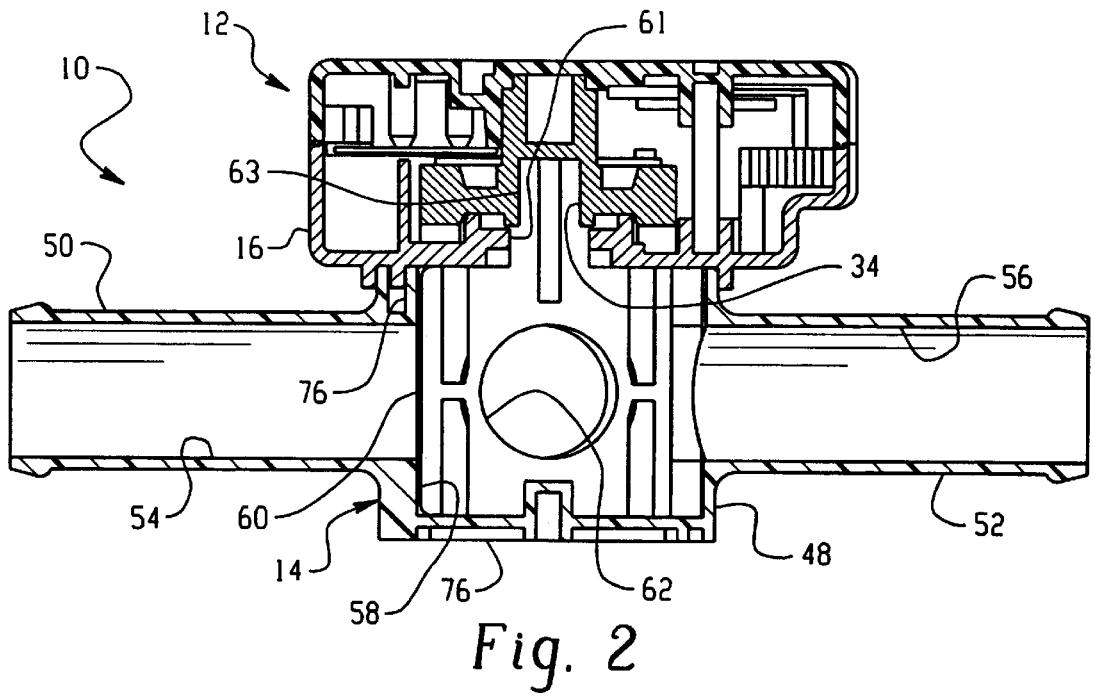
FIG. 2 is a cross-section taken along section indicating lines 2—2 of FIG. 1.
Figure 3:
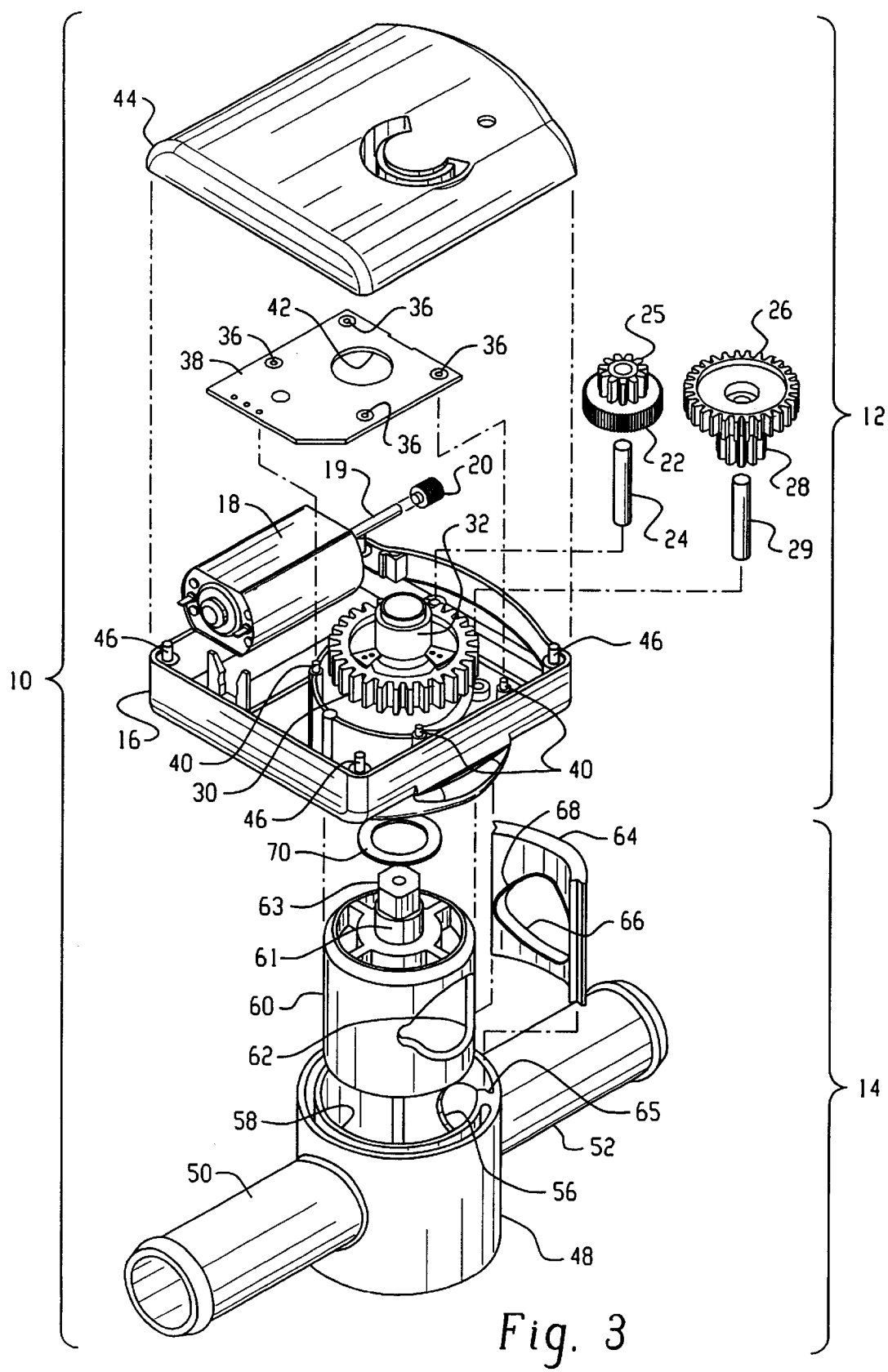
FIG. 3 is an exploded view of the valve assembly of FIG. 1.

Referring to FIGS. 1, 2 and 3, the valve assembly of the present invention is indicated generally at 10 and includes a motor drive subassembly indicated generally at 12 and a valve body subassembly indicated generally at 14. The motor drive subassembly 12 includes a housing shell 16 which has assembled therein a motor 18 which has a drive worm 20 on the shaft 19 thereof which worm engages worm gear 22 journalled on a pin 24 pressed into housing shell 16. Worm gear 22 has a first stage pinion 24 thereon which engages a reduction gear 26 mounted on a second pin 28 pressed into housing 16. Reduction gear 26 has thereon a second stage pinion 28 which rotates therewith and which engages an output gear 30 journalled on housing shell 16; and, gear 30 has a hub 32 projecting therefrom. Output gear 30 has drive surfaces 34 formed on the undersurface thereof as shown in FIG. 2 and which are adapted for driving engagement therewith as will hereinafter be described in greater detail.

Referring to FIG. 3, a deck plate 38 is received over the motor gear arrangement and has a plurality of apertures 36 therein for engagement with guide pins 40 provided on the housing shell 16. Deck plate 38 has a clearance aperture 42 formed therein which has the output gear hub 32 extending therethrough.

A cover 44 is then received over the housing 16 and located thereon by engagement with a second set of pins 46 provided on the housing shell; and, cover 44 is then secured to the housing shell 16 by sonic weldment to form the motor drive subassembly 12.

The valve body subassembly 14 includes a valve body 48 having oppositely directed connector fittings 50, 52, extending generally in opposite directions and having formed therein, respectively, an outlet passage 54 and an inlet passage 56, which passages are ported to a generally cylindrical valving cavity 58 formed in the body 48.

A rotary valve member 60 having preferably a generally cylindrical configuration with a transverse or cross port 62 formed therethrough is rotatably received in the cavity 58 in closely fitting arrangement. The rotary valve member 60 has a drive hub 61 extending axially therefrom and which has provided thereon driving surfaces 63 configured and sized to engage the driving surfaces 34 provided on the output gear 30.

An arcuately shaped resilient face seal member 64 is received in grooves 65 provided in the valving chamber 58. Such member 64 has a flow passage 66 received therethrough which is oriented to coincide with the inlet port in valving chamber 58 for the passage 56. The face seal member 64 has an annular lip 68 formed about the passage 66 for sealing about the outer surface of the rotary valve member 60 as the valve member is rotated.

A seal ring 70 is provided to seal between the undersurface of the housing 16 and the rotary valve member 60 and is disposed about the hub 61.

An electrical receptacle 78 is formed on the housing shell 16 and contains electrical connector terminal pins 80 therein for providing external electrical connection to the motor 18.

Figure 4:
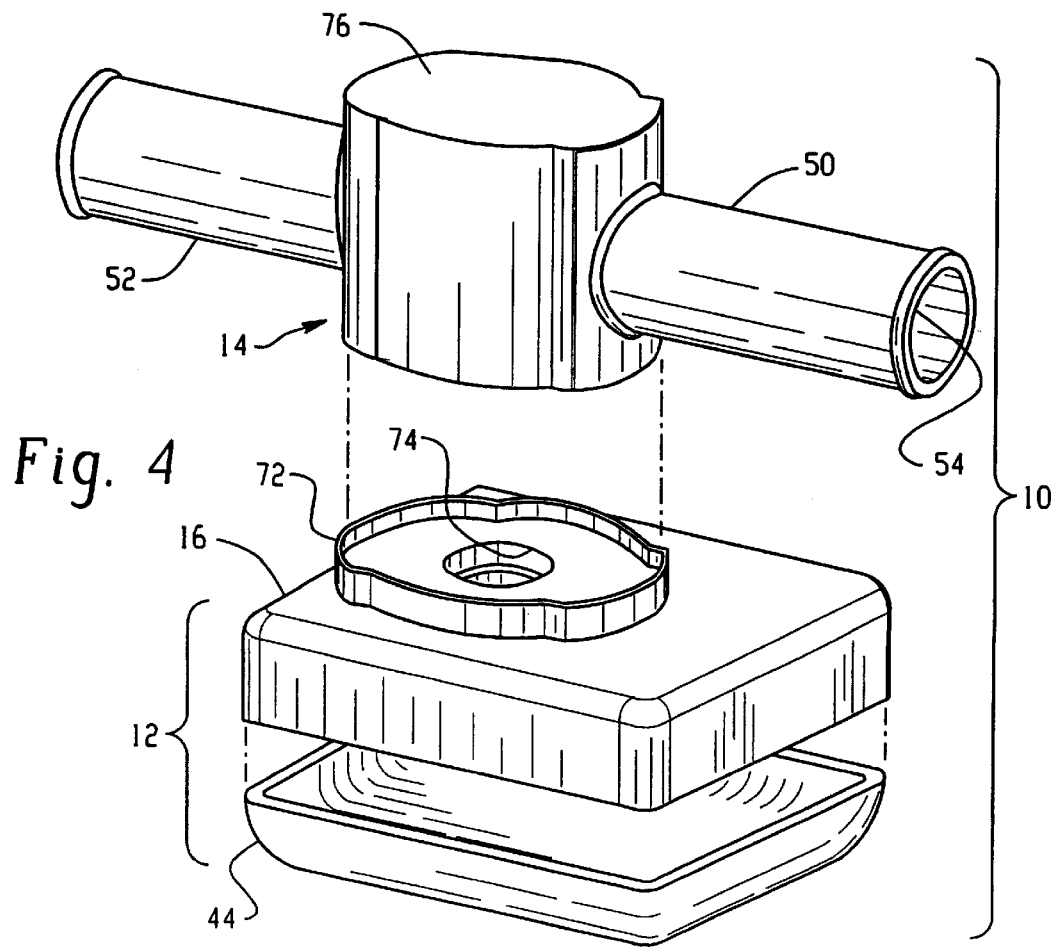
FIG. 4 is an exploded view of the motor housing and body of the present invention prior to sonic welding.

Referring to FIG. 4, it will be understood that the assembly 10 is illustrated inverted with respect to the illustration of FIG. 3; and, housing 16 has an annular rib 72 extending outwardly therefrom about the rotor engaging aperture 74. Rib 72 engages an annular groove 76 (see FIG. 2) formed in the valve body for positioning the subassembly 14 on the motor drive subassembly 12. A vibrator transducer (not shown) is then placed in contact with the surface 76 of the valve body; and, ultrasonic vibrations are induced in the valve body to effect weldment of the groove 76 and rib 72.

The present invention thus provides a relatively low cost and robust technique for assembling a servo operated rotary water valve of the type suitable for motor vehicle heater core applications.

Although the invention has hereinabove been described with respect to the illustrated embodiments, it will be understood that the invention is capable of modification and variation and is limited only by the following claims.

What is claimed is:

1. A servo actuated rotary valve assembly comprising:
   (a) a valve body having a valving chamber with an inlet port and an outlet port and a valving member disposed in said chamber communicating with said ports, said valving member rotatable in said chamber for controlling flow between said inlet port and said outlet port, said valve body having first attachment surfaces thereon;
   (b) a motor housing having a motorized drive therein including an output rotor engageable externally of said housing, said housing having second attachment surfaces therein corresponding with said first attachment surface, wherein said first and second attachment surfaces are joined by sonic welding; and,
   (c) said output rotor engages said valving member for effecting rotary movement of said valving member, wherein one of said first and second attachment surfaces includes a groove and the other includes a rib nested inside the groove.

2. The valve assembly defined in claim 1, wherein said rib and said groove have a corresponding annular configuration.

3. A servo actuated rotary valve assembly comprising:
   (a) a valve body having a valving chamber with an inlet port and an outlet port and a valving member disposed in said chamber communicating with said ports, said valving member rotatable in said chamber for controlling flow between said inlet port and said outlet port, said valve body having first attachment surfaces thereon;
   (b) a motor housing having a motorized drive therein including an output rotor engageable externally of said housing, said housing having second attachment surfaces therein corresponding with said first attachment surface, wherein said first and second attachment surfaces are joined by sonic welding; and,
   (c) said output rotor engages said valving member for effecting rotary movement of said valving member, wherein said valve body and said motor housing are formed of polyamide material having about one-third by volume filler of glass material.

4. A method of making a servo actuated rotary valve assembly comprising:
   (a) disposing a rotary valve member in a valve body and providing an inlet port and an outlet port in said body communicating with said valve member and rotating, said valve member for controlling flow between said inlet and outlet ports;
   (b) forming a first attachment surface on said body;
   (c) disposing a motorized drive with an output rotor in a housing and forming a second attachment surface on said housing corresponding to said first attachment surface;
   (d) engaging said output rotor with said rotary valve member and joining said first and second attachment surfaces by sonic weldment; and,
   (e) forming a groove on one of said first and second attachment surfaces and forming a rib on the other and interfitting said rib in said groove.

5. The method defined in claim 4, wherein said step of forming a groove includes forming an annular groove and said step of forming a rib includes forming an annular rib.

6. A method of making a servo actuated rotary valve assembly comprising:
   (a) disposing a rotary valve member in a valve body and providing an inlet port and an outlet port in said body communicating with said valve member and rotating, said valve member for controlling flow between said inlet and outlet ports;
   (b) forming a first attachment surface on said body;
   (c) disposing a motorized drive with an output rotor in a housing and forming a second attachment surface on said housing corresponding to said first attachment surface;
   (d) engaging said output rotor with said rotary valve member and joining said first and second attachment surfaces by sonic weldment; and,
   (e) forming said body and said housing of polyamide material having about one-third by volume glass filler.

* * * * *